May 16, 1950 L. E. THOMPSON 2,507,739

RADIO RELAYING

Original Filed Feb. 6, 1945 3 Sheets-Sheet 1

INVENTOR
LELAND E. THOMPSON.
BY H. S. Grover
ATTORNEY

May 16, 1950 L. E. THOMPSON 2,507,739

RADIO RELAYING

Original Filed Feb. 6, 1945 3 Sheets-Sheet 2

INVENTOR.
LELAND E. THOMPSON
BY H. S. Grover
ATTORNEY.

INVENTOR.
LELAND E. THOMPSON
BY H. S. Grover
ATTORNEY.

Patented May 16, 1950

2,507,739

UNITED STATES PATENT OFFICE 2,507,739

RADIO RELAYING

Leland E. Thompson, Merchantville, N. J., assignor to Radio Corporation of America, a corporation of Delaware Original application February 6, 1945, Serial No. 576,453. Divided and this application January 18, 1946, Serial No. 642,045

5 Claims. (Cl. 332—23)

This is a division of my copending United States patent application entitled "Radio relaying," Serial No. 576,453, filed February 6, 1945.

As explained more fully in my copending application referred to above, it is extremely desirable when multiplexing to have modulating circuits which are free of distortion. Unless this condition is fulfilled undesirable cross-modulation between channels takes place. My present invention has for one object the provision of a frequency modulation system which has substantially linear characteristics. Another object of the invention is to provide a modulating arrangement which shall be free of undesired modulations which might otherwise follow because of the use of imperfectly filtered, rectified alternating currents as a source of power.

In carrying out these aspects of the invention, a pair of oscillation generators are employed, each of which is provided with a reactance tube type of modulator. The modulating potentials so control the reactance tubes as to cause the oscillators to vary oppositely in frequency. The output of each oscillator is independently frequency multiplied and the frequency multiplied waves combined to produce a desired frequency modulated wave. As a result of this arrangement, the oscillators are operated over a relatively small part of a relatively large, substantially linear, operating range. In this way, linearity of operation is effectively increased and distortion minimized.

As will be explained more fully hereinafter, use of imperfectly filtered power supply sources for the reactance tubes cause frequency changes which tend to be self-cancelling. This feature also is highly desirable.

Figure 1:
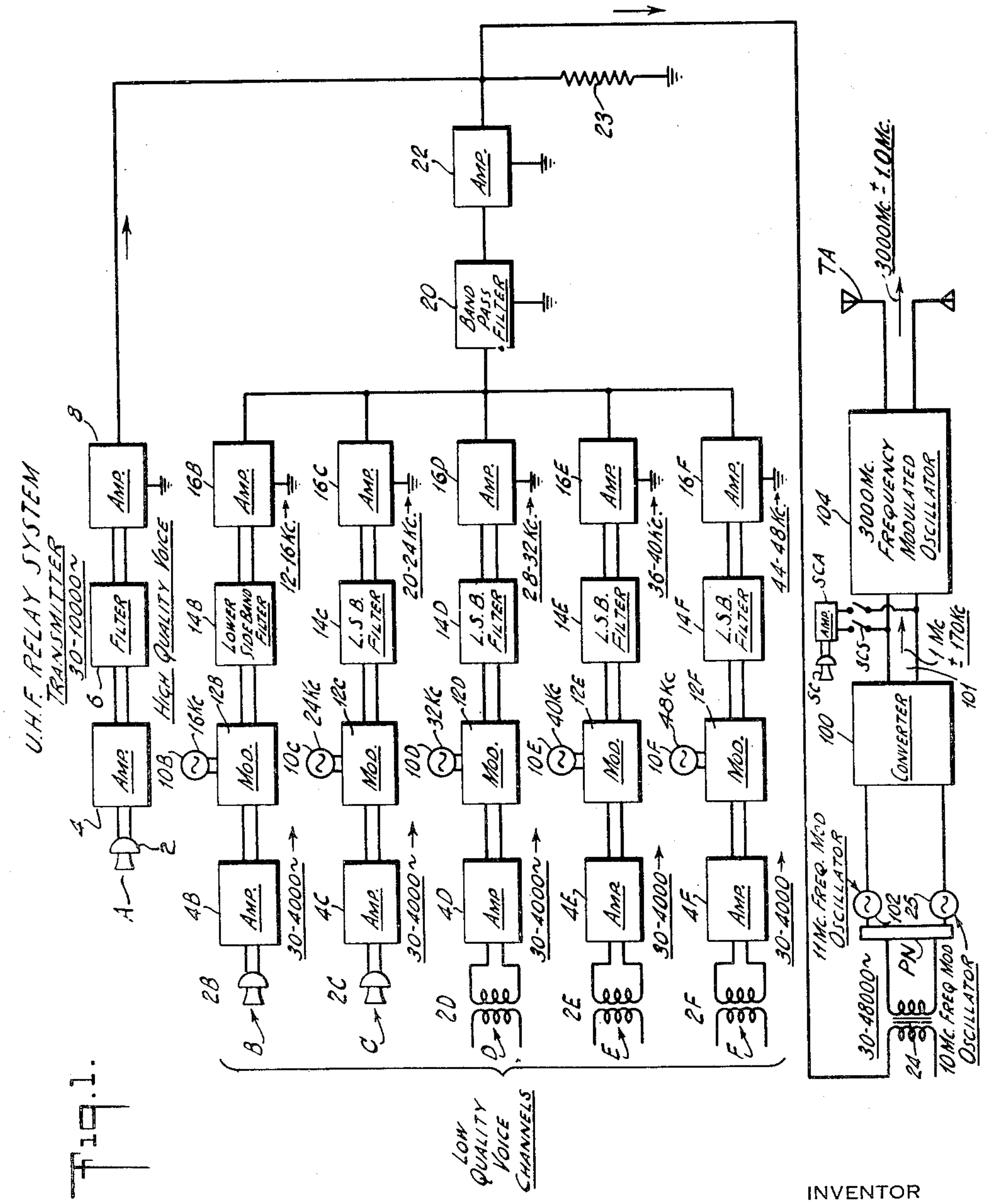

In the accompanying drawings Figure 1 illustrates schematically a transmitting terminal for an ultra high frequency relay system. The terminal makes use of a high quality voice channel having, as indicated, an upper frequency of 10,000 cycles although if desired this may be raised to 15,000 cycles and several other signaling channels which are transmitted to a common amplifier as side bands of suitable sub-carriers. All of the signals are combined, pre-emphasized in a suitable network and used to frequency modulate a common sub-carrier having, as illustrated, a mean frequency of one megacycle. The latter, in turn, is used to frequency modulate a transmitted carrier having a mean frequency of 3,000 megacycles.

Figure 2:
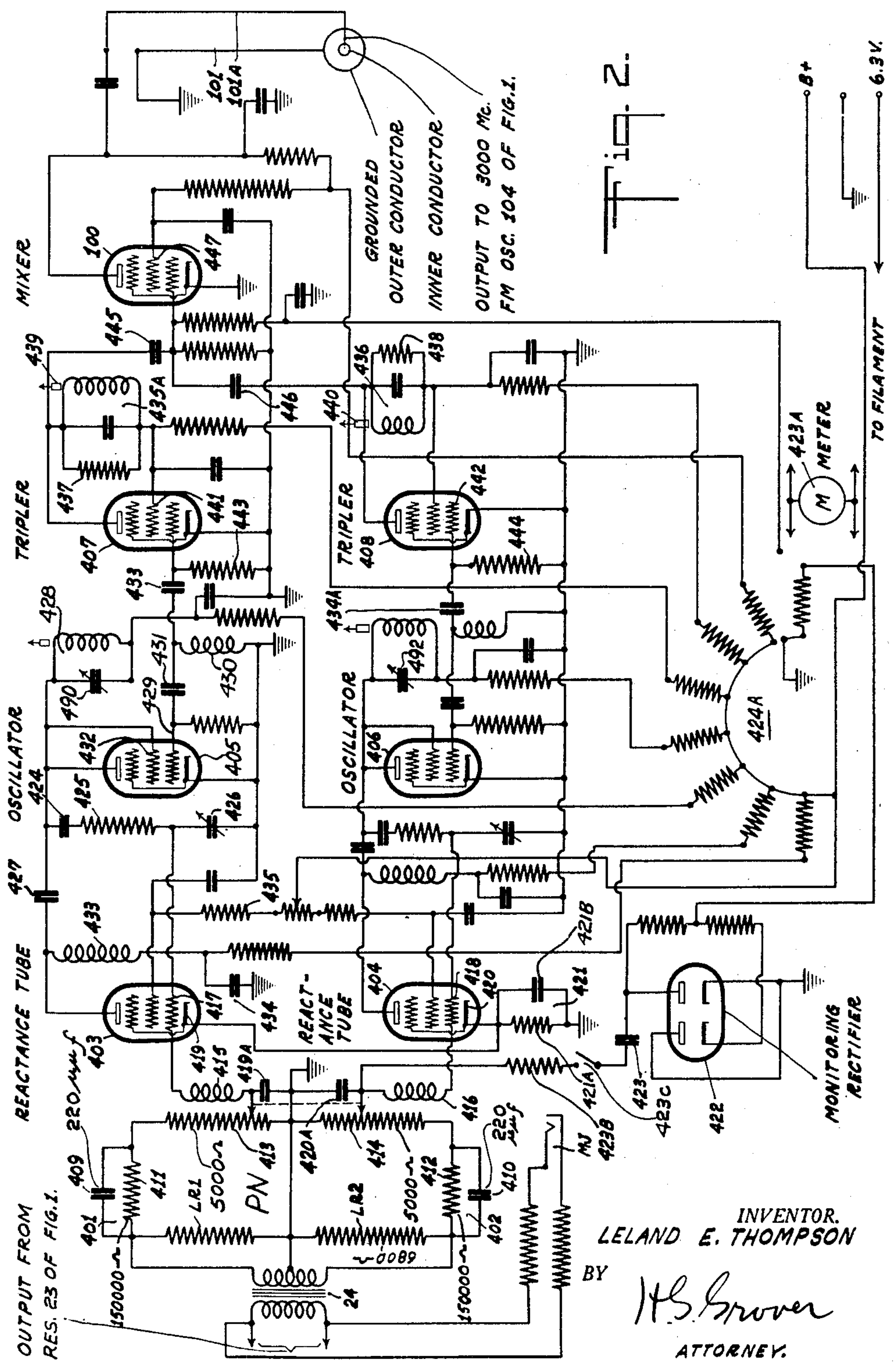

Figure 2 is a wiring diagram of circuits utilizing the combined channels of Figure 1 to produce a common frequency modulated sub-carrier. In order to secure linearity at this critical point a pair of oppositely frequency modulated oscillators are used which are operated over a relatively small range. The outputs of the oscillators are frequency multiplied and combined in a converter in order to produce a sub-carrier of proper mean frequency and desired frequency swing.

Figures 3, 4, 5, 6:
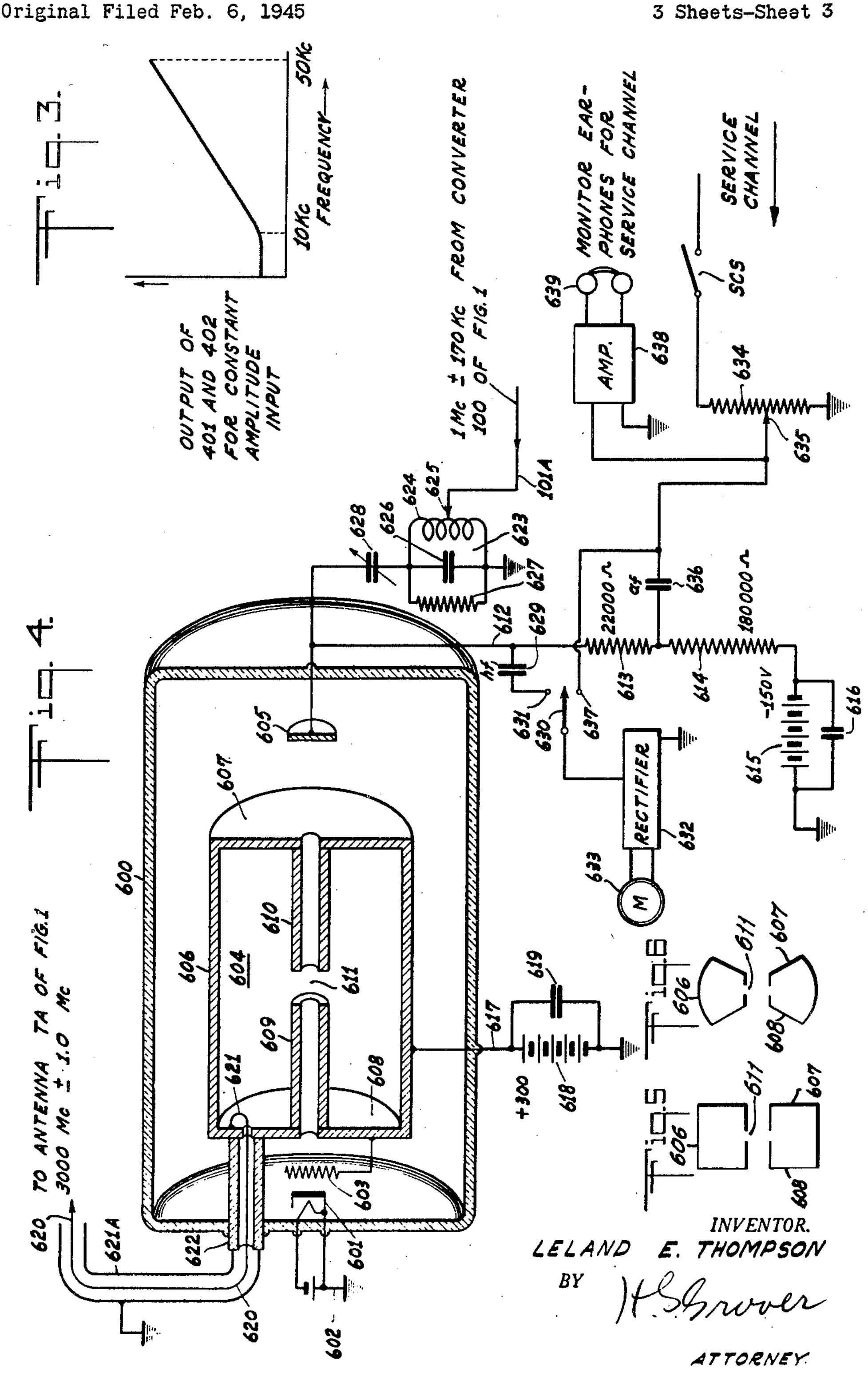

Figure 3 illustrates the characteristic of the pre-emphasizing network used in the apparatus of Figures 1 and 2.

Figure 4 schematically illustrates a high frequency oscillation generator which may be used at 104 in Figure 1.

Figures 5 and 6 are diagrammatic showings in cross-section of cavity resonators which may be used in an oscillator of the type shown in Figure 4.

Turning more specifically to Figure 1, the signal channels are designated by the letters A to F, inclusive. These channels, which will be described in greater detail later, are combined in resistor 23 and fed through transformer 24 and pre-emphasing network PN to oppositely frequency modulate oscillators 25 and 102. Network PN is described more fully later in connection with Figs. 2 and 3.

Oscillator 25 may operate, by way of example, at an unmodulated frequency of 10 megacycles and oscillator 102, for example, at an unmodulated frequency of 11 megacycles. The outputs of the two oscillators 25 and 102 are combined in the converter 100 as a result of which the frequency modulation appearing in the peak frequency output of converter 100 is equal to the sum of the deviations of the oscillators 25 and 102 when they are caused to separate in frequency. In a modification, which will be described later, the outputs of oscillators 25 and 102 are frequency multiplied before being combined in converter 100.

It will therefore be apparent that each oscillator, in the arrangement of Figure 1, need swing only half as far as would be the case if only one oscillator were used to produce a given amount of frequency modulation. As a consequence, distortion is reduced since the working range of the oscillators is made smaller and over the smaller range they can be made more linear in action. Cross-modulation between channels is therefore greatly reduced. Furthermore, such an arrangement serves to reduce hum due to filament heating or ripple in the plate voltage supply.

Each of the channels A to F, inclusive, is adjusted in amplitude so that the deviation ratio for the frequency modulation produced by each channel in the output of converter 100 is unity, but the total maximum swing produced by all of the channels is plus and minus 170 kilocycles as indicated in the drawing. In other words, channel A produces a maximum swing of 10 kilocycles in the output of converter 100, channel B a maximum of 16 kilocycles, channel C 24 kilocycles, etc. When all of the channels are of maximum amplitude and producing maximum frequency deviation and, also, when all of the signals are instantaneously additive, the output of converter 100 is then being modulated plus and minus 170 kilocycles. The foregoing adjustment and operation are provided by use of the pre-emphasizing network PN, as a result of which the signaling channels have substantially the same signal-to-noise ratio—a desirable feature in multiplex signaling.

The frequency modulated output of the converter 100 is a beat of one megacycle plus and minus 170 kilocycles and is used to frequency modulate a second frequency modulated oscillator 104 whose mean unmodulated frequency is 3000 megacycles.

As a result the wave radiated over the transmitting antenna TA of Figure 1 is a 3000 megacycle carrier having a maximum deviation of plus and minus 1.0 megacycle. A greater deviation ratio for the waves modulated in frequency modulator 104 may be used if desired so that the transmitted wave would be of the order of 3000 megacycles plus and minus two or four megacycles.

More specifically, with reference to the channels A to F, inclusive, channel A is a high quality voice channel containing all frequencies in the band from 30 to 10,000 cycles.

The high quality voice signal is picked up by microphone 2, amplified by amplifier 4 and sent through filter 6 and another amplifier 8 to the combining resistor 23.

Channels B to F, inclusive, are low quality voice channels each passing through the first amplifiers 4B, 4C, 4D, 4E and 4F, different voice signals lying in the band from 30 to 4,000 cycles. These amplified signals are fed to the modulators 12B to 12F, inclusive, supplied with oscillations from separate oscillators 10B to 10F, inclusive.

The output of the modulator 12B is fed through a filter 14B which passes only the lower side band. Similarly, filters 14C to 14F, inclusive, pass only the lower side bands produced, respectively, in modulators 12C to 12F, inclusive. In the case of filter 14B, the band of frequencies passed on to amplifier 16B occupies the range from 12 to 16 kilocycles.

Similarly, the lower side band filters 14C to 14F, inclusive, pass on to amplifiers 16C to 16F, inclusive, the lower side bands derived from the immediately preceding modulators 12C to 12F, inclusive. The frequency band passed by each side band filter is indicated in Figure 1. Thus 14C passes 20–24, kilocycles, etc.

The outputs of the lower side band amplifiers 16B to 16F, inclusive are combined as indicated and fed through a band pass filter 20 to amplifier 22, which is made as linear as possible to prevent cross-modulation between channels. The output of amplifier 22 is combined with the output of the high quality channel from amplifier 8 in resistor 23.

The resulting voltage across resistor 23 occupies a band of frequencies from 30 to 48,000 cycles and this band is fed through transformer 24 to the oppositely frequency modulated oscillators 25 and 102 having, respectively, unmodulated carrier frequencies of ten and eleven megacycles. The amplitude of the voltages fed from each channel is adjusted, as will be more fully explained later, so that each channel produces frequency modulation in the output of converter 100 with a deviation ratio of unity. Thus, channel A having an upper frequency of 10,000 cycles deviates the output of converter 100 an amount of plus and minus 10,000 cycles. Similarly, the maximum amplitude of voltage fed through channel B to resistor 23 produces a deviation of plus and minus 16 kilocycles and, similarly, for maximum amplitude of input channels C, D, E and F produces, respectively, deviations of plus and minus 24 kilocycles, plus and minus 32 kilocycles, plus and minus 40 kilocycles and plus and minus 48 kilocycles. When all of the channels are fully modulated and when they are all additive or instantaneously in phase and of the same polarity, the beat between oscillators 25 and 102 appearing in the output of converter 100 is deviated a maximum of plus and minus 170 kilocycles.

The frequency modulated output of 100, namely, a difference frequency of one megacycle plus and minus 170 kilocycles is picked off and used to frequency modulate the second frequency modulated oscillator 104 operating at an unmodulated carrier frequency of 3000 megacycles.

The deviation ratio of the modulated waves appearing in the output circuit of the second frequency modulated oscillator 104 is unity or more, as desired, as a result of which the waves radiated over the transmitting antenna TA have for maximum deviation, a frequency of 3000 megacycles plus and minus 1.0 megacycle. A larger deviation ratio may be used, in which case the radiated waves would be, for example, 3000 megacycles plus and minus 2, 3 or more megacycles when fully modulated.

In addition to channels A–F inclusive, of Figure 1, a service channel SC may be provided. The output of the service channel pick-up microphone may be amplified by the service channel amplifier SCA and switched directly, by means of switch SCS, to frequency modulate oscillator 104. Preferably, amplifier SCA passes a band of approximately 0–5000 cycles and the amplitude of the modulating voltages is adjusted so as to produce, for example, a maximum swing of ±15,000 cycles in the output of oscillator 104.

Figure 2 is a wiring diagram of a preferred form of apparatus between transformer 24 and the 3000 megacycle frequency modulated oscillator 104 of Figure 1. Figure 2, in other words, illustrates in greater detail the frequency modulated oscillators 25 and 102 and converter 100 of Figure 1. Specifically, in Figure 2 the wave band representing channels A to F inclusive and running from 30 cycles to 48 kilocycles is fed through the secondary of transformer 24, pre-emphasis networks 401, 402 to oppositely control the conductivities of reactance tubes 403, 404. The reactance tubes oppositely vary the frequencies of oscillators 405, 406 which, by way of example, in the no signal condition may be set to run at frequencies of, respectively, 8.5 and 8.83 megacycles. Hence, when oscillator 405 increases in frequency, oscillator 406 decreases in frequency and vice versa.

The output of frequency modulated oscillator 405 is fed to a frequency tripler 407 and the output of frequency modulated oscillator 406 is fed to a frequency tripler 408. The outputs of the two triplers 407 and 408 having unmodulated frequencies of 25.5 and 26.5 megacycles are combined in the converter or mixer 100, corresponding to the converter 100 of Figure 1, to produce an unmodulated sub-carrier of one megacycle. The latter is fed through the outlet leads 101 to the 3000 megacycle, frequency modulated oscillator 104 of Figure 1.

It should therefore be clear that the oscillator diagrammatically shown at 102 in Figure 1 includes oscillator 405, reactance tube 403 and tripler 407 of Figure 4. Also schematically shown oscillator 25 of Figure 1 includes oscillator 406, reactance tube 404 and tripler 408 of Figure 4.

To go into greater detail concerning Figure 2, a monitoring jack MJ, for monitoring purposes, is connected to the primary of transformer 24. The secondary of the transformer is shunted by loading resistors LR1 and LR2. The pre-emphasis networks 401, 402 are composed of condensers 409, 410 having a value of 220 mmf. each connected in shunt to resistors 411, 412 each having a resistance of 150,000 ohms. As a consequence, the pre-emphasis networks will be found to have a characteristic which is substantially flat over the range from approximately zero to 10,000 cycles and then rises linearly with frequency from approximately 10,000 to 50,000 cycles as shown in Figure 3. In this way, the outputs of amplifiers 8 to 16F inclusive of Figure 1 may be adjusted to the same value and the pre-emphasis networks 401, 402 will operate to produce the accentuations which will give the desired deviation ratios mentioned previously in the frequency modulated output of converter 100.

The outputs of pre-emphasis networks 401, 402 are fed through volume controlling potentiometers 413 and 414 and through radio frequency chokes 415 and 416 to the first grids 417, 418 of reactance tubes 403 and 404. Radio frequency by-pass condensers 419A and 420A are provided in order to further insure absence of radio frequency currents from the pre-emphasis networks and preceding apparatus. The cathodes 419, 420 of the reactance tubes are connected in parallel and to the common cathode return resistance-condenser circuit 421 consisting of resistor 421A and condenser 421B connected in parallel. This common cathode return serves to maintain constant grid bias on the reactance tubes since they are oppositely modulated. This, therefore, avoids a certain amount of degenerative feedback at low frequencies which would otherwise occur unless the by-passing condenser 421B is made very large.

A voltage doubling rectifier 422 is connected through high resistor 423B, switch 423C, by-pass condenser 423 to the potentiometer 414, as indicated, for monitoring purposes, it being noted that in this connection a milliammeter 423A is provided. It is to be noted also that the meter 423A may be connected to the resistor bank 424A for indicating voltages and currents in various parts of the circuits, as will be evident to those skilled in the art. By means of the meter M and rectifier 422 the voltage input to the reactance tubes may be determined and adjusted so as to produce the desired frequency deviations in the oscillators 405, 406.

Quadrature voltage is fed to the grid 417 from the plate of oscillator tube 405 through the network consisting of blocking condenser 424, resistor 425 and condenser 426. As a consequence, the plate circuit of reactance tube 403 appears as a variable inductance to the plate circuit of oscillator 405, by-passing condenser 427 having a negligible effect in this regard.

Tube 405 acts as an oscillator because the tuned plate circuit 428 is coupled back on to the grid 429 through tickler coil 430 and by-pass condenser 431. The screen grid 432 of tube 405 is connected directly to the plate of that tube, as indicated, as a result of which tube 429 acts essentially as a triode.

Other circuit elements of the reactance tube 403, such as choke 433 for supplying plate voltage, by-pass condenser 434 and voltage dropping resistor 435 and similar elements for the oscillator 405, are believed to be understandable from the drawings and need not be discussed in detail.

Since reactance tube 404 and oscillator 406 are similar in all essential respects to reactance tube 403 and oscillator tube 405, there is no need to go into detail concerning the corresponding circuit elements which have just been discussed. It may be stated, however, that 404 also appears as a variable inductance across the circuit including tube 406, but since signal voltages cause tube 403 to become more conductive and 404 less conductive and vice versa, the frequency of operation of the oscillators 405 and 406 are varied oppositely. Hence, for a given frequency swing the effective range over which each oscillator is varied is made smaller, resulting in greater linearity in operation. The extent of this range is further effectively reduced by having these oscillators, namely 405, and 406 operate the frequency triplers 407, 408. The triplers serve to effectively triple the deviation produced in the oscillators and, hence, when the outputs of the triplers are beat together in mixer 100, the output of the mixer 100 contains a deviation which is of a value corresponding to three times the difference in deviations of the oscillators 405, 406.

The triplers 407, 408 are fed from the oscillators through coupling condensers 433, 434A. The triplers are overloaded vacuum tubes and, hence, by appropriate tuning of the plate circuits 435, 436, the third, or for that matter, any desired harmonic may be picked off. These output circuits may be broadened by the use of resistors 437, 438 and tuned by means of the variable iron cores 439, 440. Such variable iron core tuning is also indicated for the plate circuits of the oscillators 405, 406. The tripler tubes 407, 408 have their grids 441, 442 connected to ground through resistors 443, 444.

The chosen harmonic output of circuits 435 and 436 is fed through condensers 445 and 446 to the grid 447 of the mixer or detector 100. Consequently, if the output circuits 435 and 436 are tuned to the third harmonics of their preceding respective oscillators 405, 406, and assuming oscillators 405 and 406 to be operating at 8.5 and 8.83 megacycles in the absence of input at transformer 24, then the waves appearing in the output leads 101 will have a frequency equal to substantially one megacycle. As before explained, presence of signal in transformer 24 will cause the frequency of the waves appearing in leads 101 to vary as desired, depending upon the adjustment of potentiometers 413 and 414. These adjustments may be made such that this one megacycle wave appearing in leads 101 is frequency modulated plus and minus 170 kilocycles when all channels A to F inclusive are supplying maximum amplitude voltages to the amplifier 22 of Figure 1.

To summarize with reference to Figure 2, the band of frequencies from 30 to 48,000 cycles is pre-emphasized by the networks 401, 402 so that the input to the reactance tubes 403, 404 is flat over the frequency range from 30 to 10,000 cycles and rises linearly from 10,000 to 48,000 cycles. This characteristic is indicated in Figure 3. The volume of the input to the reactance tube modulators 403, 404 is controlled by means of potentiometers 413, 414. The reactance tubes 403, 404 serve to oppositely modulate the frequencies of oscillators 405, 406. Since 407 and 408 are operated beyond saturation, desired harmonics may be picked out by the tuned output circuits of the frequency multipliers 407, 408 and the deviation will be increased according to the order of the harmonic chosen. The outputs of the frequency multipliers 407, 408 are beat together in a mixer 100 and the output of the mixer or detector 100 is, therefore, a frequency modulated wave having very linear frequency deviation with amplitude of input applied at the reactance tubes. Such action is highly important in order to avoid undesirable cross-modulation of the signalling channels. The output of mixer 100 may be fed through a coaxial line having a grounded outer metallic tube and an inner conductor to the next stage of the system, namely, apparatus 104 of Figure 1.

In connection with the reactance tubes of Figure 2, such as, for example, tube 403, it is to be noted that the quadrature voltage developing condensers such as 426 should be made variable so that quadrature voltage feed-back may be controlled and reduced to any desired extent. Also by adjustment of the quadrature condenser, such as 426, the apparatus may be operated with optimum linearity. As set up each oscillator, such as tubes 405, 406 and its corresponding reactance tube, namely, 403 and 404, is substantially linear over a range of operation of approximately $\pm$200,000 cycles. Of this range only a relatively small portion is used, for example, approximately $\pm$30 kilocycles in order to insure extreme linearity of frequency modulation or frequency shift with the applied modulating voltages fed to the grids of the reactance tubes 403, 404 from potentiometer 413, 414. The precautions in the securing of extreme linearity are observed in order to reduce cross-modulation, for it is at this point in the transmitting apparatus that cross-modulation due to non-linearity will tend to take place to the greatest extent.

The common band-pass filter 20 and common amplifier 22 of Figure 1 should be designed so as to have a wide flat characteristic of from 10,000 to 100,000 cycles to not only avoid the introduction of undesirable distortion and amplitude changes, but also to accommodate additional channels, if desired. Further, in order to minimize distortion and cross-modulation, amplifier 22 of Figure 1 should be operated on a linear portion of its characteristic. Amplifier 22 may include degeneration so as to improve linearity, if desired. Typical degenerative circuits and principles which may be used in connection with amplifier 22 are to be found in such patents as Black Patent 2,102,671 and Oman Patent 2,255,804.

Also, it will be noted that the reactance tubes 403, 404 of Figure 2 are operated over a relatively small range which is substantially linear so that distortion and cross-modulation are minimized. The circuits of the oscillator tubes 405, 406, such as the tuned output circuits and in particular the tuned output circuits of the triplers 407, 408, are made sufficiently broad so as to be substantially wider than the frequency swings of the currents fed to these circuits. The output circuit 435A of tripler 407 is broadened by resistor 437 so as to be flat over a band which is substantially wider than the frequency swing appearing in the output circuit of tube 407. For example, the characteristic of circuit 435A should be flat over a band of 400 kilocycles for a frequency swing of $\pm$75,000 cycles. The output circuit of mixer 100 should be flat over a band 800,000 cycles wide where the maximum frequency shift of the waves appearing therein is $\pm$150 kilocycles. In this way, phase distortion is kept to a very small value thereby further reducing the cross-modulation which may occur due to the unlinear phase characteristics of the circuits. In other words in order to minimize cross-modulation due to phase distortion, it is preferred that the frequency swing used in the circuits up to and including the mixer 100 be well within the flat portion of the amplitude frequency characteristics of the circuits involved.

A further advantage of the modulating system shown in Figure 2 arises from the fact that if the cathodes are energized with alternating currents and if the anodes or other electrodes are supplied with imperfectly filtered, rectified commercial sixty cycle power current, the variations in excitation will tend to cause the oscillators 405, 406 to change in frequency in the same direction. Hence, these changes in frequency tend to become self-cancelling in the mixer 100.

If desired, automatic frequency controlling circuits may be used in connection with the modulating apparatus of Figure 2. In that event, a part of the output appearing in lead 101A may be divided down in frequency and used to operate a reversible motor, in turn operating a tuning condenser of one of the oscillators 405, 406 such as the tuning condenser 490 of oscillator 405 or the plate circuit tuning condenser 492 of oscillator 406. Or, if desired, both tuning condensers may be actuated by the automatic frequency control motor in such a way as to bring the beat in 101A to its desired mean value. The manner in which the tuning condenser is varied by the frequency divided waves may be that arrangement as described in Morrison Patent 2,250,104.

Also if desired and in the alternative, automatic frequency control may be applied to one of the reactance tubes 403 or 404 by first heterodyning down a part of the output appearing in lead 101A with waves from a crystal controlled oscillator and discriminating and detecting the resulting beat for use in one or both of the reactance tubes 403, 404. This arrangement may follow the principles and apparatus described in Crosby Patent 2,279,659. Or, automatic frequency control, using part of the output appearing in lead 101A and a connection to the reactance tubes for that purpose, may be employed using the circuits and principles of Schaeffer Patent 2,274,434.

It should be apparent, therefore, that several advantages flow from the arrangement shown in Figure 2. For a given frequency deviation desired in the waves appearing in line 101, the oscillators 405, 406 need be varied only over a relatively small range. Hence, extreme linearity is secured in this portion of the apparatus. This is desirable for, otherwise, departures from linearity would produce relatively large amounts of cross-modulation. Furthermore, the arrangement of Figure 2 balances out and substantially reduces hum due to ripple in the plate voltage power supply and A. C. heating of the cathodes of the various tubes involved.

In Figure 4 there is shown a form of high frequency oscillation generator which may be used at 104 in Figure 1. Figure 4 also illustrates circuits for producing frequency modulation of the high frequency oscillator.

The oscillation generator of Figure 4, comprises an evacuated container 600 which may be of glass or metal, within which are contained a heated cathode 601, a screen electrode diagrammatically illustrated in section 603, a cavity resonator 604, and a disc-like metallic anode or electron receiving plate 605. The cathode 601 is externally grounded at 602. The cavity resonator 604 is made of metal and consists of a metallic cylinder 606 having metal bases 607, 608. Mechanically and electrically fixed to the bases are the internally protruding sleeves or tubes 609, 610 separated so as to have between them a gap 611. The tube 600, cavity resonator 604, sleeves 609, 610 and plate 605 are shown in cross section.

Actually the cavity resonator may have different dimensions and be proportioned differently, than as shown in Figure 4. The distance between the bases 607, 608 may be equal to or less than the internal diameter of the cylinder 606, as shown diagrammatically in cross-section in Figure 5. Also, the bases may be dished in and the cavity resonator have the toroidal or doughnut shape shown in cross-section in Figure 6.

The anode 605 of Figure 4 is maintained at a negative potential of the order of −150 volts with respect to ground by means of lead 612 connected through resistors 613 and 614 to a suitable source of potential 615 by-passed to ground by means of the by-pass condenser 616. The cavity resonator 604, together with the grid 603 connected thereto, is maintained at positive potential of the order of +300 volts, for example, with respect to ground by means of lead 617 connected to a suitable source of potential 618 by-passed by condenser 619.

As a result of the foregoing construction, electrons emitted from the cathode 601 are attracted to and pass through the hollow portion of tube 609 across gap 611 and through tube 610. The electrons then approach the negatively charged anode 605 only to be repelled and attracted back across the gap 611. In this way, the cavity resonator 604 is excited so that high frequency waves are set up therein at a frequency determined, in the main, by the cubical content of the cavity resonator 604. The frequency of operation is also dependent, to a certain extent, upon the voltages applied to the various oscillator elements.

Output energy is taken from resonator 604 by means of conductor 620 coupled by means of the inductive loop 621 to the space within the cavity resonator 604. Conductor 620 is suitably shielded by means of the externally grounded metallic coaxial conductors 621A, 622. The high frequency conductor 620 leads to and excites the transmitting antenna TA of Figure 1.

When the oscillator in Figure 4 is used in the transmitting arrangement of Figure 1, it is modulated by the output of the converter or mixer 100 of Figures 1 and 2. The output of mixer 100 is fed through conductor 101$a$ to the anode circuit of anode 605 of Figure 4. In the case of the transmitter of Figure 1 conductor 101$a$ will carry a frequency modulated wave of one megacycle having a maximum frequency deviation of ±170 kilocycles, according to the example chosen.

The waves in conductor 101$a$, referring to Figure 4, are resonated in the parallel tuned circuit 623 comprising coil 624, to which conductor 101$a$ is variably tapped at tapping points 625, and condenser 626. The tuned circuit 623 is broadened by use of a loading resistor 627 connected in shunt to the circuit. By means of variable condenser 628, the frequency modulated waves appearing in line 101$a$ are applied in controllable amounts, to the plate 605. As a consequence, the ouput of the oscillator of Figure 4, appearing in lead 620, is frequency modulated to an extent which may be controlled primarily by adjustment of condenser 628, and secondarily by adjustment of tap 625.

Since the negative voltage applied to the lead 612 is fed through resistors 613, 614 which may, by way of example, be 22,000 and 180,000 ohms in value, respectively, leakage of the waves appearing in circuit 623 to ground through lead 612 is effectively prevented.

For monitoring and adjustment purposes, a portion of the high frequency waves fed through condenser 628 to the plate 605 may be shunted through high frequency by-passing condenser 629 to switch 630. The latter, in its upper contact position 631 feeds the rectifier 632 to the output of which is connected a suitable meter 623. The rectified output of rectifier 632 will indicate the voltage applied to plate 625 and will be a measure of the frequency deviation in the oscillations generated by the oscillation generator and fed to the output transmission line 620.

The service channel is fed through switch SCS of Figure 4, which corresponds to switch SCS of Figure 1, across a potentiometer 634. For modulating the high frequency oscillator of Figure 4 with the service channel voltages, the latter are fed through tap 635, audio frequency by-pass condenser 636, across resistor 614 and through resistor 613 and lead 612 to the anode 605 of the oscillation generator. By throwing switch 630 to the lower position 637, the extent of the frequency modulation produced by the service channel may then be measured by noting the reading on meter M which will then be actuated by rectified service channel voltages. For aurally monitoring the service channel an amplifier 638 and earphones 639 are provided, as indicated.

It is again repeated that all values of frequencies, resistances, voltages, etc. are given as illustrative or typical only and, therefore, it is to be clearly understood that all inventions described herein with reference to all figures of the drawings are not to be restricted to such values.

In Figure 4 the filament heating voltage source for cathode 601 is illustrated to be a battery but this battery may be replaced by a transformer supplying suitable alternating voltages to the filament for heating the cathode to an electron emissive condition. Also, the sources 618 and 615 for the cavity and plate may be replaced by potentiometers supplied with rectified commercial 60 cycle current. Such alternating currents for exciting the filament and the ripple in the rectified voltages may produce 60 cycle and 120 cycle frequency modulation of the output of the oscillator of Figure 4. This hum will therefore appear in the service channel. It will not appear, however, in the high quality channel A or in the channels B to F inclusive, since such low frequency modulation is effectively filtered out by the selective circuits for those channels.

This filtering action follows since there is a substantial separation in frequency between the first significant side bands produced by the subcarrier in the output of converter 100 and the side bands produced by the low frequency power modulation. The low frequency power modulation is produced by the 60 cycle heating supply or harmonics of 60 cycles representing ripple in the rectified power supply. This undesired low frequency modulation may also be produced by undesired mechanical vibration.

It is to be noted that oscillators of the type shown in Figure 4 are peculiarly susceptible to this low frequency type of frequency modulation due to mechanical vibration or the use of imperfectly filtered rectified power or due to the use of alternating current operation of the cathodes. It is one feature of my invention that the type of modulated oscillator shown in Figure 4, which is particularly susceptible to frequency modulation due to imperfectly filtered, rectified power or to the use of alternating current on the cathode, can be used without disturbing the signal.

Incidentally if it is desired to transmit a single channel, for example, high quality channel A alone, amplifier 22 of Fig. 1 would be switched out of circuit so that across resistor 23, only voltages from channel A or amplifier 8 would be set up. Channel A would be adjusted so as to produce a full deviation of plus and minus 170 kilocycles in the output of converter 100.

If we assume that the high quality channel A is used to produce a single frequency modulation, that is to say, directly frequency modulate the radiated carrier as suggested, then the signal to noise ratio as compared to a corresponding amplitude modulation system will be equal to the square root of 3 multiplied by the deviation ratio. In this case it will be $$\frac{\sqrt{3}\times 1{,}000{,}000}{10{,}000}=173$$

This assumes, of course, that there is no stray frequency modulation or what might be termed the frequency modulation produced by A. C. operation of the filaments and produced by ripple in the power supply.

If a double frequency modulation system is used such as shown in Figure 1, in which the high quality channel is used to frequency modulate the output of converter 100 and this in turn to frequency modulate the output of the transmitter 104, I have found the signal to noise improvement over the amplitude modulation system previously referred to to be equal to $$1.23\times R1\times R2,$$

where R1 is the deviation ratio in the output of converter 100 and R2 is the deviation ratio in the output of the high frequency transmitter. Hence, if the channel A of Figure 1 is used exclusively and the channels B to F inclusive are removed from the circuit and assuming channel A produces the full frequency modulation of plus and minus at 170 kilocycles in the sub-carrier output of converter 100 and that this sub-carrier is used to produce a deviation of 1.17 mc. in the output of transmitter 104, the signal to noise ratio will be $$1.23\times\frac{170{,}000}{10{,}000}\times\frac{1{,}000{,}000}{1{,}000{,}000}=21$$

approximately. Hence, the double frequency modulation system is inferior to the single frequency modulation system insofar as decreased extraneous noise and natural disturbances are concerned.

However, as before explained, with oscillators of the type shown in Figure 4 which are susceptible to undesirable power supply frequency modulation, this disadvantage is in part, at least compensated. Of great importance, as explained herein, the use of double frequency modulation offers advantages in a system employing a number of repeater or relaying stations. This advantage is discussed more fully in my parent application.

The frequency of operation of the oscillator of Figure 4 is determined by the dimensions of resonator 604 and may be controlled by providing suitable externally operated means for warping of the sides of the cavity resonator 604 so as to change its internal volume. Also, the frequency may further be controlled by adjustment of the voltages applied to the electrodes of the oscillator.

Having thus described my invention, what I claim is:

1. In combination, a pair of oscillators operating at different frequencies, each of said oscillators having a separate frequency-determining resonant circuit, circuits for oppositely modulating the frequencies of the oscillators with control voltages, individual frequency multipliers for separately frequency multiplying the outputs of the modulated oscillators, and a mixer for beating together the separately frequency multiplied outputs of the frequency multipliers.

2. In combination, a circuit carrying a complex wave representative of a plurality of signaling channels, a pair of oscillation generators, each of said generators having a separate frequency-determining resonant circuit, circuits for oppositely frequency modulating the oscillators by said complex wave over a relatively small, substantially linear range to minimize distortion and cross-modulation, separate frequency multipliers for separately multiplying the frequency of the outputs of said oscillators, and a mixer for mixing and combining the separately frequency multiplied outputs of said multipliers.

3. Apparatus as claimed in the preceding claim characterized by the fact that reactance tubes are provided for modulating said oscillation generators, said reactance tubes having a common cathode return resistor which maintains substantially constant bias on both reactance tubes despite application of modulating waves thereto.

4. Apparatus for producing frequency modulated waves comprising a pair of oscillation generators each operating at a different frequency, each of said generators having a separate frequency-determining resonant circuit, a pair of reactance tubes for oppositely modulating the frequencies of said oscillation generators, separate multipliers for separately frequency multiplying the outputs of said generators, and a mixer for mixing the separately frequency multiplied outputs of said multipliers, said apparatus being so arranged that voltage variations applied to said tubes and oscillators tending to produce changes in frequency in the same direction prove self-cancelling in the output of said mixer.

5. A frequency modulation generating system, comprising a pair of oscillators operating at different frequencies, a pair of reactance tubes for oppositely frequency modulating said oscillators, means for combining waves derived from said oppositely modulated oscillators to form a frequency modulated subcarrier, a high frequency oscillator having its frequency-determining circuit in the form of a cavity resonator, and means for applying said subcarrier to a negatively charged anode electrode of said high frequency oscillator to frequency modulate the output thereof.

LELAND E. THOMPSON.

REFERENCES CITED

The following references are of record in the file of this patent:

UNITED STATES PATENTS

| Number | Name | Date |
|---|---|---|
| 2,169,212 | Armstrong | Aug. 15, 1939 |
| 2,279,660 | Crosby | Apr. 14, 1942 |
| 2,296,962 | Tunick | Sept. 29, 1942 |
| 2,304,388 | Usselman | Dec. 8, 1942 |
| 2,345,101 | Crosby | Mar. 28, 1944 |
| 2,425,657 | Tunick | Aug. 12, 1947 |